US009326496B2

(12) United States Patent
Chmura

(10) Patent No.: US 9,326,496 B2
(45) Date of Patent: May 3, 2016

(54) ADJUSTABLE TUBULAR HOLDING APPARATUS PARTICULARLY USEFUL IN FISHING

(71) Applicant: Mark Chmura, Bear Lake, MI (US)

(72) Inventor: Mark Chmura, Bear Lake, MI (US)

( * ) Notice: Subject to any disclaimer, the term of this patent is extended or adjusted under 35 U.S.C. 154(b) by 0 days.

(21) Appl. No.: 14/739,209

(22) Filed: Jun. 15, 2015

(65) Prior Publication Data
US 2015/0366180 A1 Dec. 24, 2015

Related U.S. Application Data

(60) Provisional application No. 62/014,330, filed on Jun. 19, 2014.

(51) Int. Cl.
| F16M 13/00 | (2006.01) |
| A01K 97/10 | (2006.01) |
| F16M 11/18 | (2006.01) |
| F16M 11/08 | (2006.01) |
| F16M 13/02 | (2006.01) |
| F16M 11/16 | (2006.01) |

(52) U.S. Cl.
CPC ............... *A01K 97/10* (2013.01); *F16M 11/08* (2013.01); *F16M 11/16* (2013.01); *F16M 11/18* (2013.01); *F16M 13/022* (2013.01)

(58) Field of Classification Search
CPC ........ F16L 3/2235; H02G 3/02; A01K 91/08; A01K 97/01; A01K 97/10; A01K 87/08; F16M 11/18; F16M 11/08; F16M 13/022; F16M 11/16
USPC ............ 248/183.11, 422, 520, 521, 538, 514, 248/515; 43/21.2
See application file for complete search history.

(56) References Cited

U.S. PATENT DOCUMENTS

| 2,576,212 A | 11/1951 | Carter |
| 2,682,127 A | 6/1954 | Binder |
| 2,890,847 A | 6/1959 | Minton et al. |

(Continued)

FOREIGN PATENT DOCUMENTS

| GB | 2365914 A | 2/2002 |
| JP | H07298817 A | 11/1995 |
| WO | 2012160351 A1 | 11/2012 |

OTHER PUBLICATIONS

International Search Report and Written Opinion for PCT/US2015/035757 mailed Oct. 1, 2015.

*Primary Examiner* — Gwendolyn Baxter
(74) *Attorney, Agent, or Firm* — Andrus Intellectual Property Law, LLP

(57) ABSTRACT

An adjustable holding assembly is provided to support a tubular member and includes a base assembly adapted to be mounted to a support surface. The base assembly includes a vertical shaft defining a vertical pivot axis, and a horizontal shaft rotatable about the vertical shaft and defining a horizontal pivot axis. A holder is adapted to receive the tubular member and is pivotally mounted to the base assembly so that the holder is simultaneously rotatable about the vertical pivot axis and the horizontal pivot axis. A single latching arrangement is carried by the horizontal shaft and is configured for selective engagement and disengagement with the base assembly to permit a one-handed adjustment of the holder simultaneously about the vertical pivot axis and the horizontal pivot axis or separately about either the vertical pivot axis or the horizontal pivot axis to multiple angular locked positions with respect to the base assembly.

20 Claims, 6 Drawing Sheets

(56) References Cited

U.S. PATENT DOCUMENTS

| | | | |
|---|---|---|---|
| 3,531,888 A | 10/1970 | Wells et al. | |
| 5,054,737 A * | 10/1991 | DeLancey | A01K 97/10 248/515 |
| 5,761,844 A * | 6/1998 | Horschel | A01K 97/10 248/131 |
| 5,871,196 A * | 2/1999 | Martelli | A01K 97/10 248/514 |
| 6,302,367 B1 | 10/2001 | Ratza et al. | |
| 6,974,113 B1 | 12/2005 | Clark et al. | |
| 7,007,906 B2 * | 3/2006 | Slatter | A01K 91/08 114/255 |
| 7,406,795 B1 | 8/2008 | Follmar | |
| 7,669,361 B2 * | 3/2010 | Baez | A01K 91/08 114/255 |
| 7,757,424 B2 | 7/2010 | Follmar | |
| 8,413,366 B2 | 4/2013 | Malcarne | |
| 2003/0089021 A1 * | 5/2003 | Miller | A01K 97/10 43/21.2 |
| 2009/0084019 A1 | 4/2009 | Carnevali | |
| 2009/0211141 A1 | 8/2009 | Marcus | |
| 2012/0272890 A1 | 11/2012 | Henke | |
| 2013/0326929 A1 | 12/2013 | Davis | |

* cited by examiner

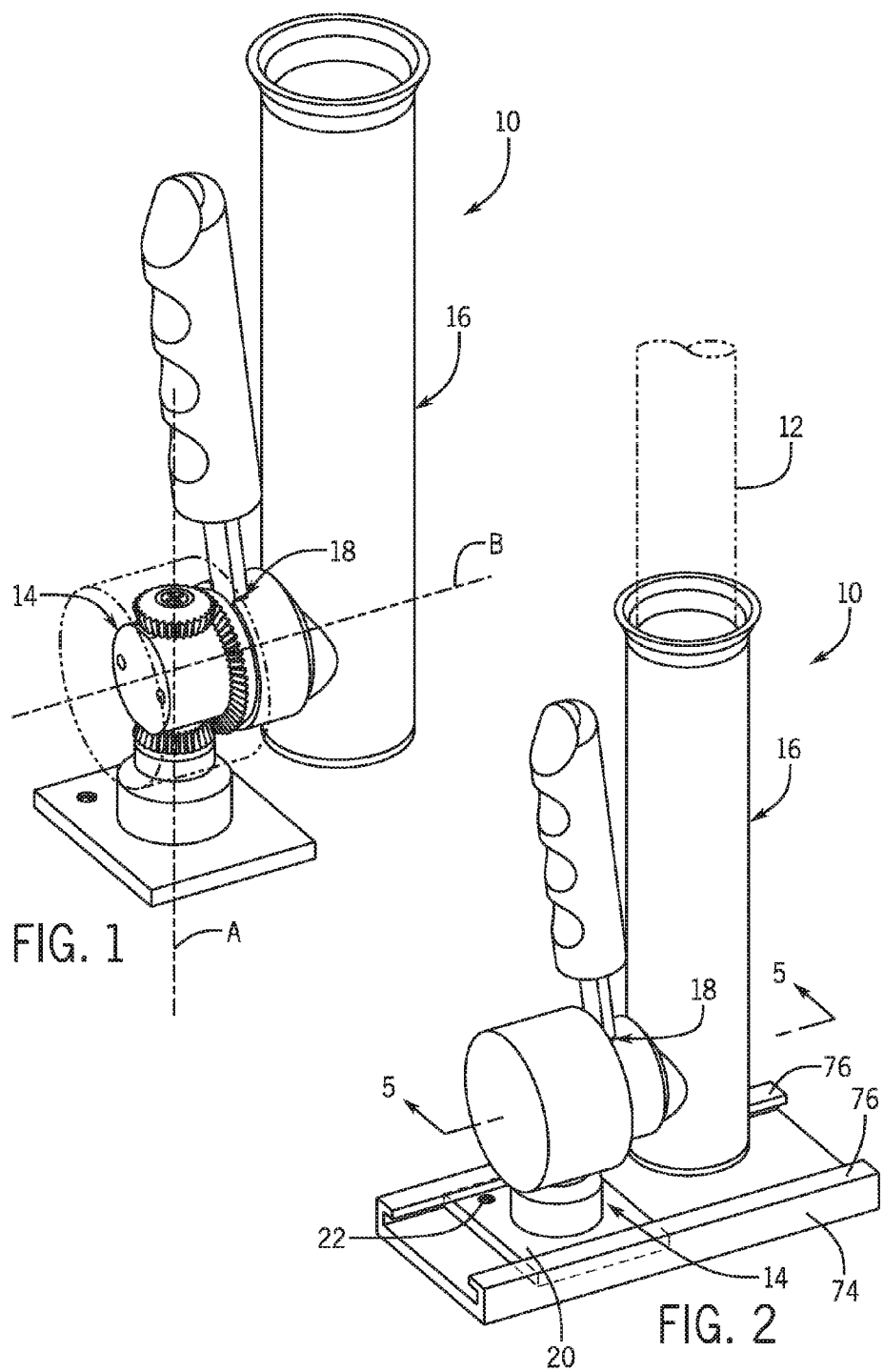

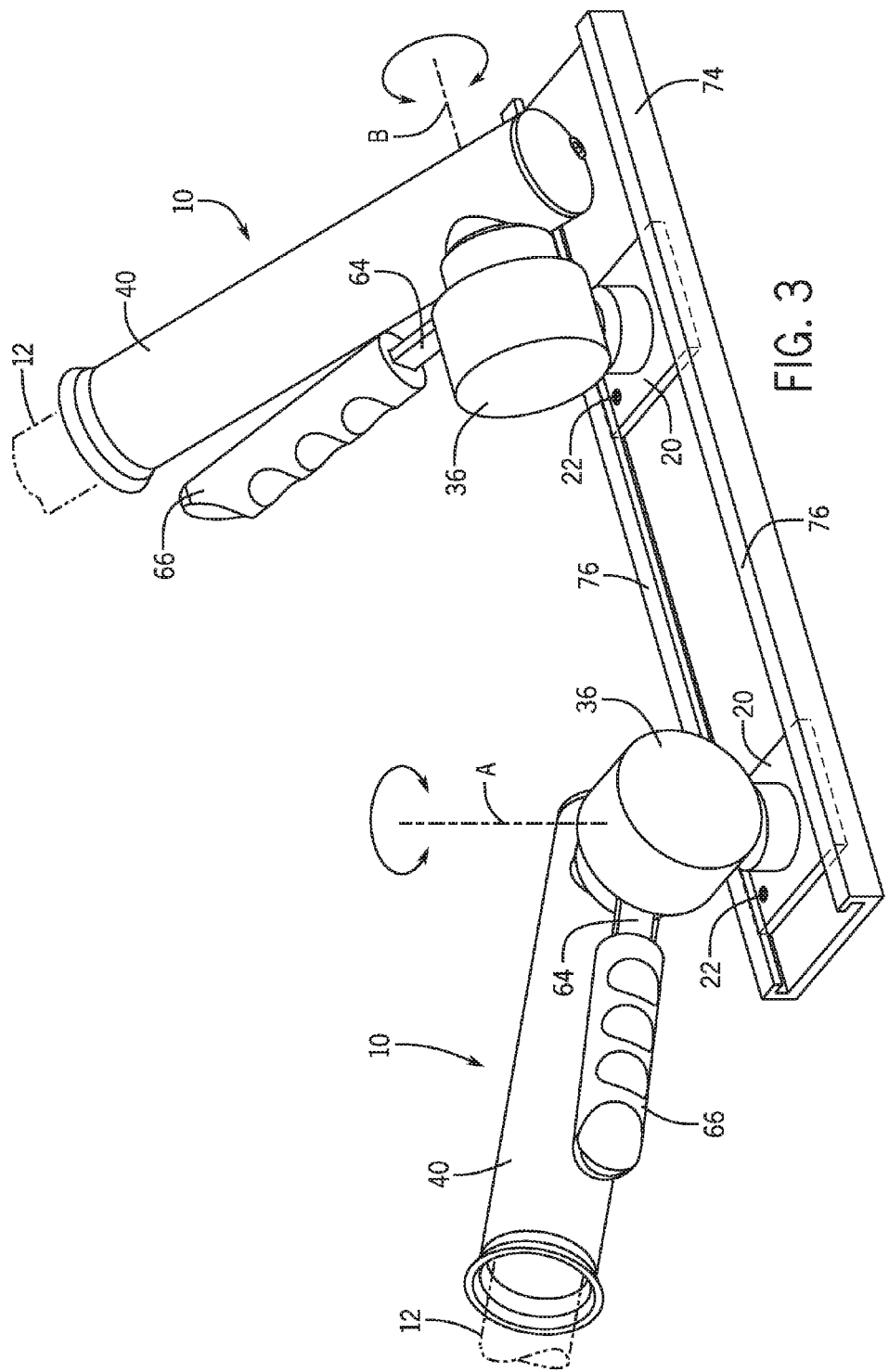

ADJUSTABLE TUBULAR HOLDING APPARATUS PARTICULARLY USEFUL IN FISHING

CROSS-REFERENCE TO RELATED APPLICATIONS

The present utility application relates to and claims priority to U.S. Provisional Application No. 62/014,330 filed Jun. 19, 2014, which is herein incorporated by reference in entirety.

BACKGROUND

The present disclosure generally relates to holding equipment for adjustably supporting a pole-like or tubular member in a range of positions. More particularly, the present disclosure pertains to a fishing rod holder which is pivotally adjustable about both horizontal and vertical pivot axes at the same time in an efficient manner.

Fishing boats are commonly equipped with mounting tracks or brackets along their port and starboard gunnels and transom top board to enable fishermen to use more than one fishing rod in order to multiply the number of possibilities for catching fish simultaneously. When so equipping fishing boats for use with multiple fishing rods deployed, it is necessary to adjust the holders into which the fishing rods are telescopically and removably inserted, handle end first, so that the respective fishing lines running from the tips of these rods do not interfere with each other. Moreover, different fishing techniques require that the fishing rods be tilted at different angles about both vertical and horizontal axes of rotation. Such dual axial adjustment is particularly desirable in commercial fishing where it is desirable to have the rod swingably adjustable about a vertical axis while extended at art angle oriented about a horizontal axis ranging from a vertical or upright position to a full down position parallel to the water surface.

Although a variety of different types of adjustable fishing rod holders have been developed, such devices require less than efficient manipulation of different structural arrangements to attain the aforementioned usage parameters. For example, certain known fishing rod holders providing pivotal movement about one or more axes require multiple locking mechanisms or steps and/or necessitate the use of two hands to effect the desired adjustment, and as a result, there remains room for improvement in these devices. That is, there is a need to improve the manner with which a fishing rod holder can be adjusted about vertical and horizontal pivot axes and to be securely held in the angular range of such pivotal movement. There is also a need to improve the range of pivotal adjustment so that the fishing rod holder can be moved through a widest possible range of horizontal and vertical movement. Further, there is a need for an adjustable fishing rod holder which makes it easier for a fisherman to remove a fishing rod from the holder when a fish strikes, but which will retain a given rod attitude if a fish strikes while the rod is in the holder.

Accordingly, it is desirable to provide an improved fishing rod holder that is conveniently adjustable to establish a variety of angular positions about both vertical and horizontal pivot axes simultaneously, that is easily engageable and disengageable among the variety of these angular ranges of pivotal motion using a one-handed operation, and that is designed to simplify removal of the rod from the holder even as the holder is being moved about the vertical and/or horizontal pivot axes.

It is likewise desirable to provide an improved adjustable holding and mounting mechanism with the foregoing characteristics that is adaptable to a number of applications that call for pivotal motion with locking and unlocking in a range of positions as may be useful in mounting similar pole-like members, such as flags, microphones, cameras with tabular handles, and the like.

SUMMARY

The present disclosure relates to an adjustable holding assembly adapted to support a tubular member in multiple angular positions. The holding assembly includes a base assembly adapted to be mounted to a support surface. The base assembly includes a vertical shaft defining a vertical pivot axis, and a horizontal shaft rotatable about the vertical shaft and defining a horizontal pivot axis. A holder is adapted to receive the tubular member and is pivotally mounted to the base assembly so that the holder is simultaneously rotatable about the vertical pivot axis and the horizontal pivot axis. A single latching arrangement is carried by the horizontal shaft and is configured for selective engagement and disengagement with the base assembly along the horizontal pivot axis to permit a one-handed adjustment of the holder simultaneously about the vertical pivot axis and the horizontal pivot axis or separately about either the vertical axis or the horizontal axis to multiple angular locked positions with respect to the base assembly.

The present disclosure further relates to an adjustable holding assembly adapted to support a tubular member. The assembly includes a base assembly adapted to be mounted to a support surface. The base assembly includes a vertical shaft defining a vertical pivot axis and a horizontal shaft rotatable about the vertical shaft and defining a horizontal pivot axis. A holder is adapted to receive the tubular member and is pivotally mounted to the base assembly so that the holder is simultaneously rotated about the vertical pivot axis and the horizontal pivot axis. A single latching arrangement is carried by the horizontal shaft and is configured for selective engagement and disengagement with the base assembly along the horizontal pivot axis to permit a one-handed adjustment of the holder simultaneously about the vertical pivot axis and the horizontal pivot axis or separately about either the vertical pivot axis or the horizontal pivot axis. The holder includes a tubular body and an adjustable head assembly mounted in the tubular body and adapted to fix a rotatable position of a tubular member supported in the holder.

BRIEF DESCRIPTION OF THE DRAWINGS

The drawings illustrate the best mode presently contemplated of carrying out the invention. In the drawings:

FIGS. 1 and 2 are perspective views of the adjustable fishing rod holder assembly in a locked position shown isolated by itself and positioned in a mounting bracket, respectively.

FIG. 3 is a perspective view showing the mounting of two adjustable fishing rod holder assemblies locked in different angular orientations and positioned in a mounting bracket.

DETAILED DESCRIPTION

Figure 4:
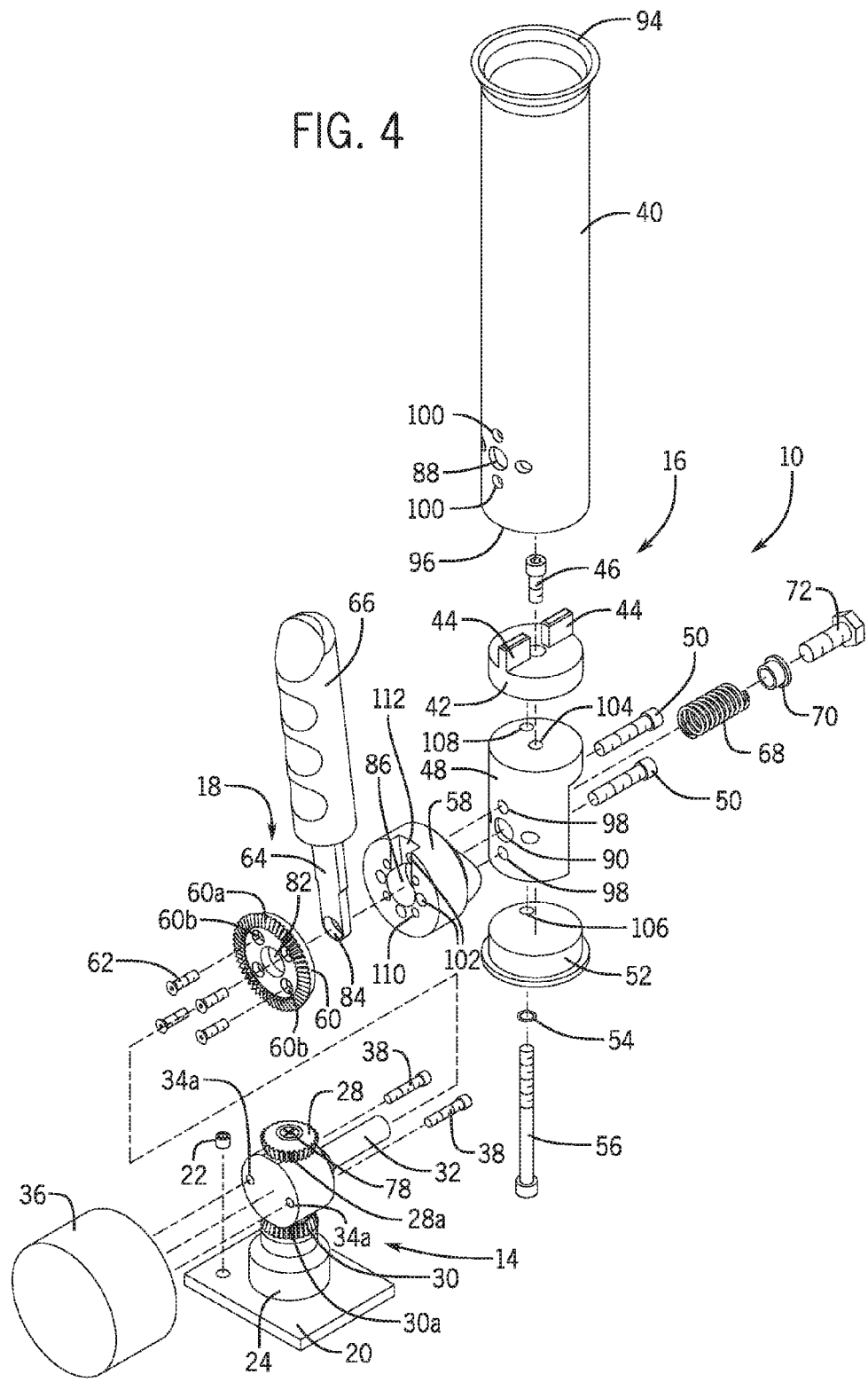
FIG. 4 is an exploded view of the adjustable fishing rod holder assembly.

Referring now to the drawings, FIGS. 1-3 illustrate different aspects of an adjustable holding apparatus of the present disclosure in the preferred form of a fishing rod holder assembly 10 for adjustably supporting a tubular member, such as a fishing rod 12. As will be appreciated hereafter, the fishing rod holder assembly 10 is uniquely designed to permit a one-handed adjustment of the fishing rod or other tubular member 12 about either a vertical pivot axis A or a horizontal pivot axis B or simultaneously about both vertical and horizontal pivot axes A and B using a single spring-biased latching arrangement 18. In addition, the fishing rod holder assembly 10 is configured to maintain a preferred rotational positioning of the fishing rod 12 or other tubular member, and enable an efficient removal of the fishing rod 12 or other tubular member which is particularly desirable during adjustment of the fishing rod holder assembly 10.

The fishing rod holder assembly 10 as seen in FIGS. 1 and 2 generally is comprised of a base assembly 14, a holder 16 and the latching arrangement 18.

Figure 5:
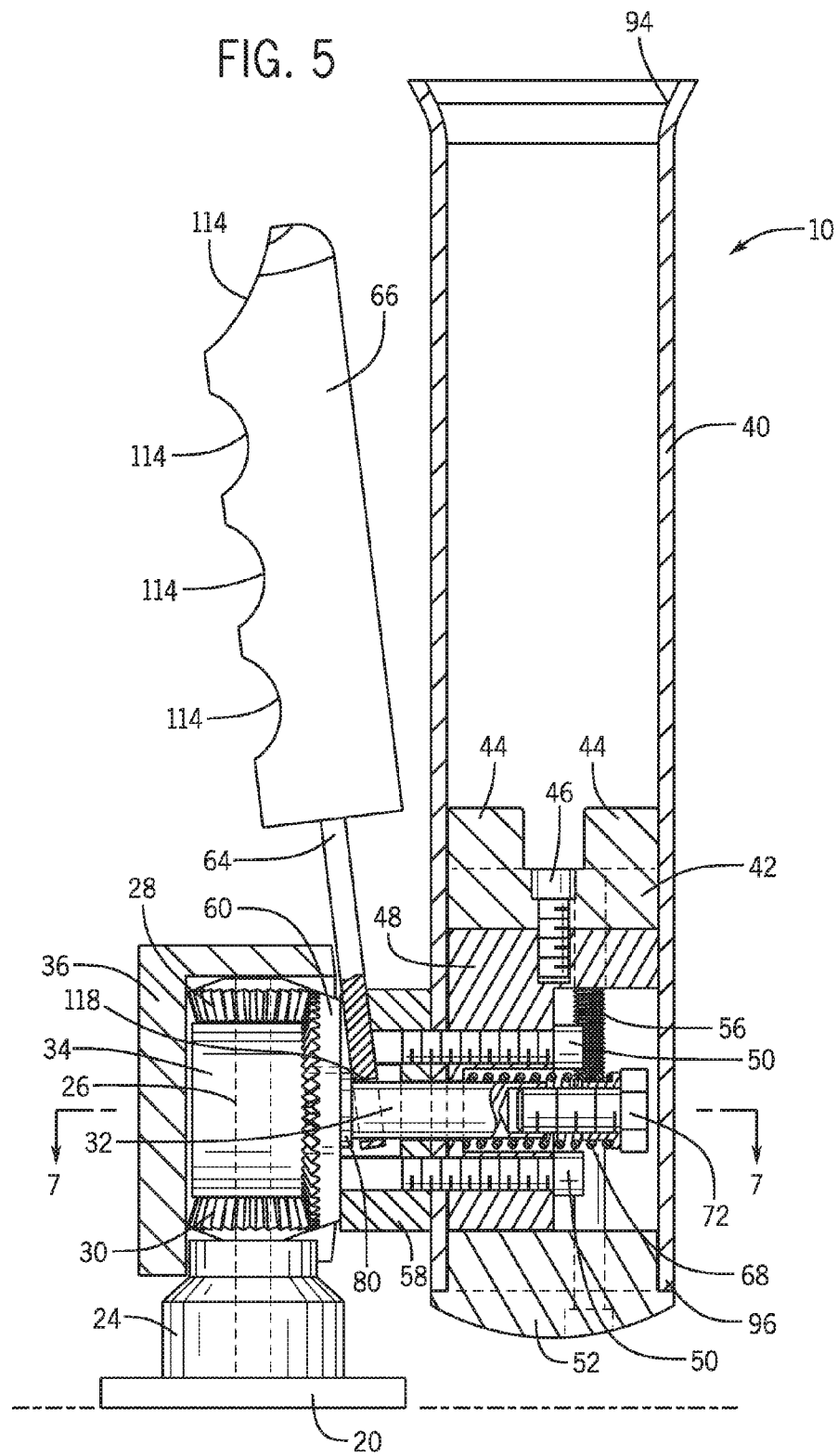
FIG. 5 is a sectional view of the adjustable fishing rod holder assembly taken on line 5-5 of FIG. 2 showing the adjustable fishing rod holder assembly in the locked position.

As best seen in FIG. 4, the base assembly 14 includes a base plate 20 with a set screw 22, a rounded stepped base 24 a vertical shaft 26 (FIGS. 5-7), an upper bevel gear 28, a lower bevel gear 30, a horizontal shaft 32 with an enlarged cylindrical end 34 mounted for rotation about the vertical shaft 28, a cover 36 and a pair of retaining screws 38.

The holder 16 generally includes a cylindrical tubular body 40, a head 42 having rod-engaging projections 44, retaining screw 46, an inner tube mount 48, a pair of holding screws 50, a holder cap 52, a washer 54 and a threaded adjustment bolt 56.

The latching arrangement 18 generally includes a hub 58, a hub bevel gear 60, a set of four retaining screws 62, a lever 64, a handle 66, a coil spring 68, a spring retainer 70 and a bolt 72.

The base assembly 14 is used in releasably mounting the fishing rod holder assembly 10 to a support surface, such as a gunnel of a fishing boat. The base assembly 14 and the latching arrangement 18 rely on selective engagement and disengagement between the upper and lower bevel gears 28, 30 and the hub bevel gear 60 to enable locking of the tubular body 40 in a plurality of angular positions, and adjustment of the tubular body 40 about the vertical and horizontal pivot axes A and B.

The Base Assembly 14

More specifically, the base plate 20 is comprised of a generally flat, thin sheet of metal which can be fixedly secured in the threaded walls defining holes formed in a bottom surface of the base 24 such as by fasteners (not shown). As depicted in FIGS. 2 and 3, the base plate 20 is configured to be slidably received and retained at a desired position within a flanged mounting track or bracket 74 which is separately fastened to the support surface on the fishing boat. The set screw 22 can be turned appropriately to raise the base plate 20 upwardly against the inwardly extending lips 76 of the mounting bracket 74 to thereby lock the base plate 20 of each fishing rod holder assembly 10 in the desired position along the length of the mounting bracket 74.

The base 24 which is securely attached to the base plate 20 is integrally formed with the vertical shaft 26 that defines the vertical pivot axis A. The upper bevel gear 28 is fixed to an upper end of the vertical shaft such as by means of a screw 78 (FIG. 4). The lower bevel gear 30 is spaced beneath the upper bevel gear 28, and is fixed to a lower portion of the vertical shaft 26, such as by a splined connection. An intermediate portion of the vertical shaft 26 has a smooth outer surface about which the enlarged cylindrical end 34 of the horizontal shaft 32 is rotatably mounted for 360° movement thereon. The upper bevel gear 28 and the lower bevel gear 30 are each formed about their entire peripheries with a plurality of similar gear teeth 28a, 30a (FIG. 4), respectively, which define various locking positions located around the vertical axis A that passes through the center of the bevel gears 28, 30.

The horizontal shaft 32 defines the horizontal pivot axis B and includes a stepped portion 80 (FIG. 7) against which a portion of the lever 64 bears as will be further detailed below. The stepped portion 80 extends from the enlarged cylindrical end 34. Further referring to FIG. 4, the horizontal shaft 32 is designed to pass through a central hole 82 in the hub bevel gear 60, an opening 84 in the lower end of the lever 64, a central bore 86 in the hub 58, a hole 88 in the tubular body 40 and a hole 90 in the inner tube mount 48. The free end of the horizontal shaft 32 extends into a lower portion of the tubular body 40, and has a blind recess 92 (FIG. 7) into which the bolt 72 is threaded. The cover 36 is connected to the enlarged cylindrical end 34 of the horizontal shaft 32 by means of the retaining screws 38 which pass through holes 34a in the end 34 and are suitably threaded into holes 36a (FIG. 7) in the cover 36. The cover 36 serves to conceal and protect an upper portion of the base 24, the bevel gears 28, 30, the enlarged cylindrical end 34 and a portion of the hub bevel gear 58 from exposure to the environment.

The Holder 16

Referring now to FIGS. 4-9, the tubular body 40 has an upper end 94 for admitting the butt of the fishing rod 12, and a lower end 96 which is closed by the holder cap 52. The holding screws 50 are passed through holes 98 on the inner tube mount 48 and holes 100 in the tubular body 40, and then screwed into holes 102 in the hub 58. Such arrangement secures the inner tube mount 48 within the tubular body 40, and fixes the hub 58 to the outside surface of the tubular body 40.

Figure 9:
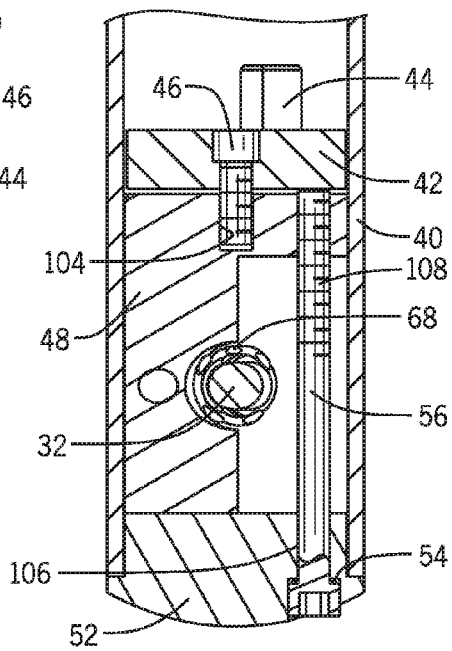
FIG. 9 is a sectional view taken on line 9-9 of FIG. 8.

As best seen in FIG. 9, the head 42 is secured to a bole 104 in the top of the inner tube mount 48 by the screw 46 such that the head 42 will normally freely rotate relative to the inner tube mount 48. However, as will be more fully appreciated hereafter, the adjustment bolt 56 can be used to limit the rotation of the head 42 and the rotation of the fishing rod 12 during use of the fishing rod holder assembly 10. More specifically, the adjustment bolt 56 is passed through the washer 54, a hole 106 in the holder cap 52 and threaded into and through an offset hole 108 formed in the top of inner tube mount 48. Turning, the adjustment bolt 56 will cause contact with the bottom surface of the head 42 to prevent the rotation thereof. The adjustment bolt 56 further serves to retain the holder cap 52 within the lower end of the tubular body 40. As seen in FIG. 4, the lower end 96 of the tubular body 40 is provided with the head 42, the inner tube mount 48, the cap 52 and the adjustment bolt 56 which together define a head assembly.

The Latching Arrangement 18

The spring biased latching arrangement 18 is used to selectively move the holder 16 between the unlocked position (FIG. 6) in which the holder 16 may be adjusted along the vertical pivot axis A and/or the horizontal pivot axis B, and the locked position (FIG. 5) in which the holder 16 is prevented from movement and is maintained in a desired angular position relative to the fixed base plate 20.

The hub bevel gear 60 is formed about its entire periphery with a plurality of teeth 60a which are designed to engage and disengage with teeth 28a, 30a. The four retaining screws 62 are passed through four holes 60b in the hub bevel gear 60 and threaded into corresponding aligned holes 110 formed in the hub 58. The lever 64 is received in a slot 112 and is retained for limited rocking motion upon the horizontal shaft 32 between the hub bevel gear 60 and the hub 58. The upper portion of the lever 64 is provided with the handle 66 which is normally formed as a soft resilient material, and is ergonomically designed with recesses 114 for receiving the fingers of a user.

The spring 68 is positioned in a recess 116 (FIG. 7) of the inner tube mount 48, and has one end engaged against an inner wall of the inner tube mount 48. An opposite end of the spring 68 is engaged against the spring retainer 70 through which the bolt 72 passes. The spring 68 also surrounds the horizontal shaft 32 and the spring retainer 70. The spring 68 is designed to provide a biasing force acting on the lever 64 and the hub bevel gear 60 to force the teeth 60a of hub bevel gear 60 into locking engagement with the teeth 28a, 30a of the upper and lower bevel gears 28, 30 so that the holder 16 is prevented from being adjusted along the vertical and horizontal pivot axes A and B as depicted in the locked position shown in FIG. 5. In the locked position, a lower end of the lever 64 bears against an upper end 118 (FIG. 5) of the stepped portion 80 of the horizontal shaft 32.

Figure 6:
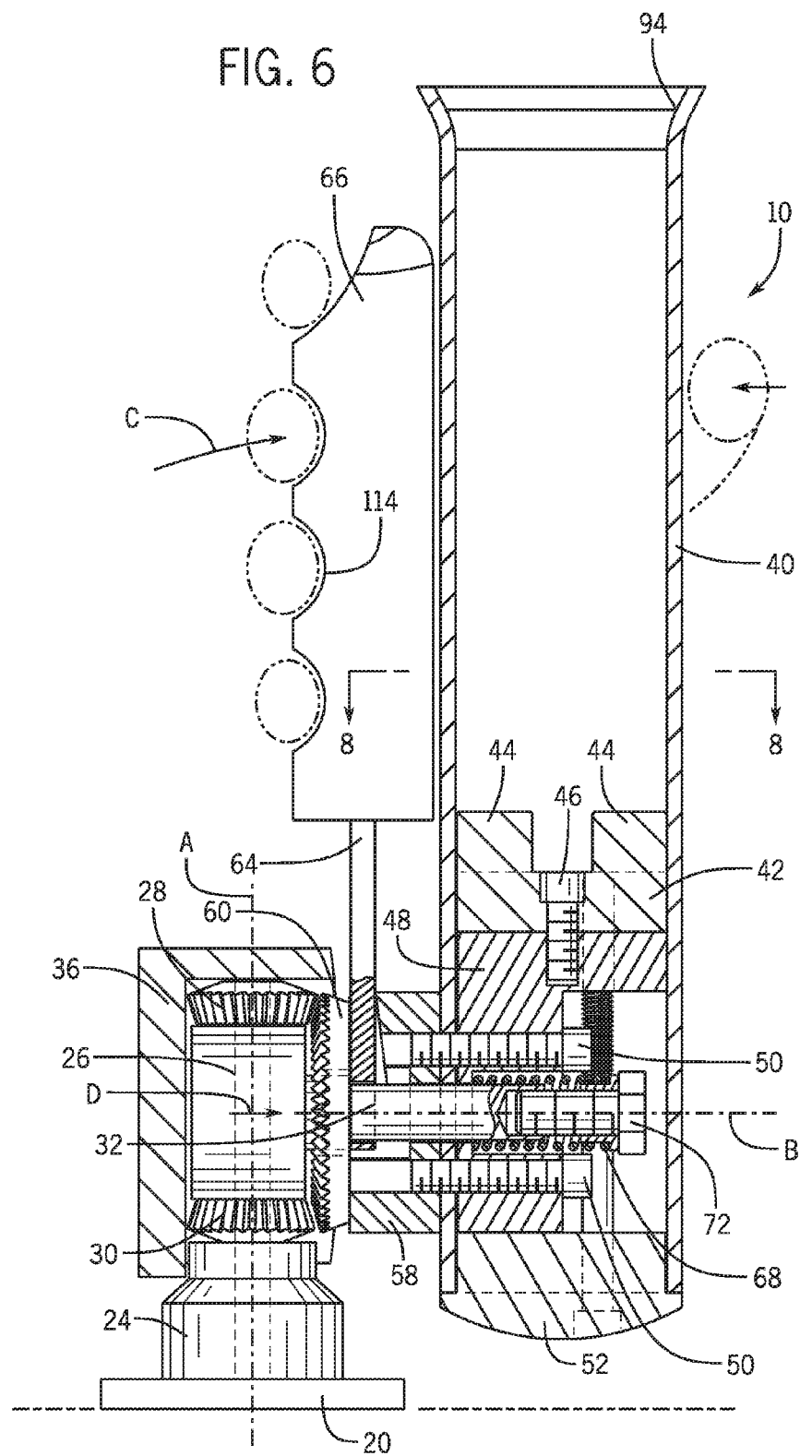
FIG. 6 is a sectional view similar to FIG. 5 showing the adjustable fishing rod holder assembly in an unlocked position.
Figure 7:
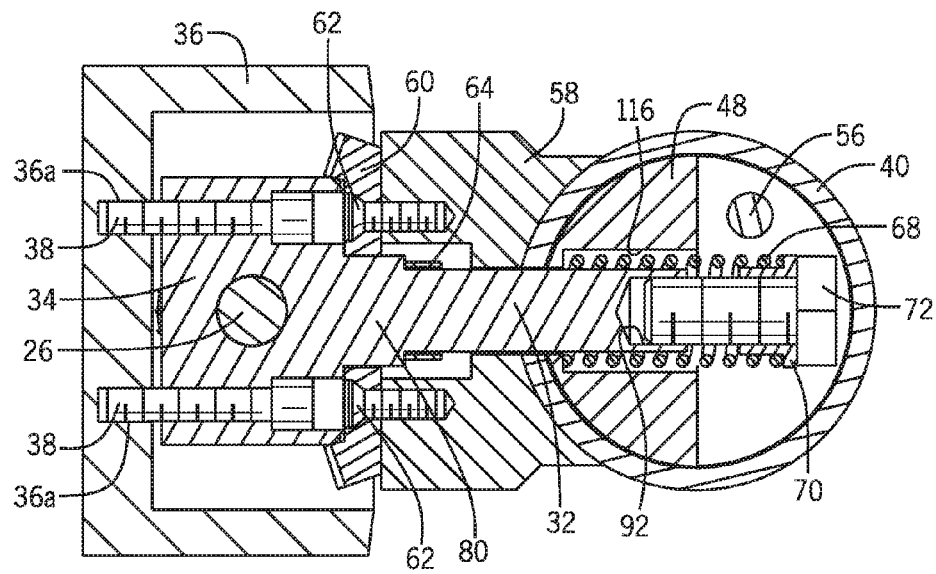
FIG. 7 is a sectional view taken on line 7-7 of FIG. 5.
Figure 8:
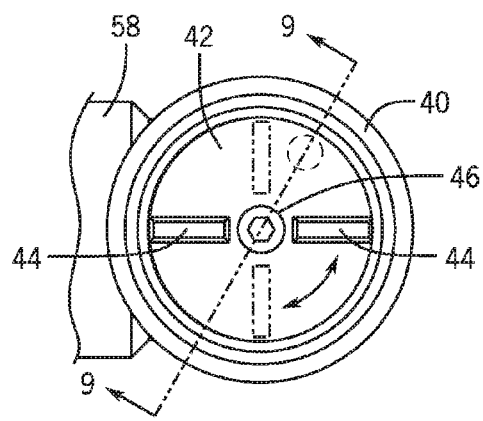
FIG. 8 is a sectional view taken on line 8-8 of FIG. 6.

When it is desired to adjust the holder 40, the fishing rod holder assembly 10 is moved to the unlocked position of FIG. 6. Here, the lever 64 is used to apply a force in the direction of arrow C which will act against the biasing force of the spring 68. Such movement causes the lever 64 to pivot about the upper end 118 of the stepped portion 80, and results in a slight lateral shifting of the holder 40, the hub 58 and the hub bevel gear 60 in the direction of arrow D along the horizontal pivot axis B which results in disengagement of the hub bevel gear 60 from the bevel gears 28, 30. The upper end 118 defines a pivot axis which is perpendicular to a plane defined by the vertical pivot axis A and the horizontal pivot axis B.

At this point, the tubular body can be adjusted about the vertical shaft 26/vertical pivot axis A and/or the horizontal shaft 32/horizontal pivot axis B separately or simultaneously. Advantageously, this adjustment can be accomplished by a user grasping the handle 66 with four fingers and the tubular body 40 with the user's thumb in a one-handed operation as depicted in phantom lines of FIG. 6. Once the holder 40 has been adjusted to the desired angular position(s) such as exemplified in FIG. 3, the handle 66 and the tubular body 40 are released and the spring 68 will cause reengagement of the hub bevel gear 60 and the bevel gears 28, 30 in the locked position to securely maintain the desired angular position of the holder 16.

Typically, the bottom end of the fishing rod 12 is provided with a cooperating socket formation (not shown) which receives the projections 44 on the head 42. When the bottom surface of the fishing rod 12 is initially engaged with the projections 44, the head mounting allows for free rotation of the fishing rod 12 within the tubular body 40 in either direction (as represented by the arrows in FIG. 8) until the desired rotational position of the rod 12 is attained, such as for example, once the line guides or eyes of the rod 12 are properly oriented. Then, the adjustment bolt 56 can be turned to cause engagement with the head 42 such that the desired rotational position of the rod 12 is maintained.

In use, it should be appreciated that the aforedescribed fishing rod holder assembly 10 is easily adjusted along vertical and horizontal pivot axes A and B separately or simultaneously, and maintained in a wide variety of angular positions by a single spring-biased latching arrangement using a one-handed operation. With such an adjustment assembly 10, a fisherman can adjust the holder 16 with one hand and, in one continuous motion with the other hand, can easily remove the fishing rod 12 from the tubular body 40 which is extremely desirable such as when a fish strikes.

The fishing rod holder assembly 10 is a marked improvement over prior art holding mechanisms which require multiple latching assemblies, adjustment steps, and/or use of two hands to effect positioning of a holder about vertical and horizontal pivot axes. The fishing rod assembly 10 also provides a more reliable positive locking of a holder in a desired angular position as contrasted by holder assemblies which employ bolt and nut locking devices that can be involuntarily unlocked because of vibrational forces incurred during boat travel. Further, the fishing rod holder assembly 10 is configured to conceal and protect the bevel gears 28, 30, 60 from dirt, excess moisture and other materials so as to ensure a longer lifetime while providing an overall pleasing aesthetic design.

It should be understood that the present disclosure contemplates that the above described principles of construction and operation can be employed in adjustable holding apparatus other than fishing rod holders that require rotational locking and unlocking action, such as in various adjustable tubular supporting and holding devices, for example, flag poles, microphones, cameras and the like.

Accordingly, the invention is not limited to the particular embodiment disclosed and is intended to cover equivalent structures that lie within the scope of the invention as defined in the following claims particularly pointing out and distinctly claiming the subject matter regarded as the invention.

What is claimed is:

1. An adjustable holding assembly adapted to support a tubular member in multiple angular positions, the assembly comprising:
   a base assembly adapted to be mounted to a support surface, the base assembly including a vertical shaft defining a vertical pivot axis and a horizontal shaft rotatable about the vertical shaft and defining a horizontal pivot axis;
   a holder adapted to receive the tubular member, and pivotally mounted to the base assembly so that the holder is simultaneously rotatable about the vertical pivot axis and the horizontal pivot axis; and
   a single latching arrangement carried by the horizontal shaft and configured for selective engagement and disengagement with the base assembly along the horizontal pivot axis to permit a one-handed adjustment of the holder simultaneously about the vertical pivot axis and the horizontal pivot axis or separately about either the vertical pivot axis or the horizontal pivot axis to multiple angular locked positions with respect to the base assembly.

2. The adjustable holding assembly of claim 1, wherein the base assembly includes a base plate fixed to a base integrally formed at a lower end of the vertical shaft.

3. The adjustable holding assembly of claim 1, wherein the base assembly includes an upper bevel gear fixed to an upper end of the vertical shaft, and a lower bevel gear spaced beneath the upper bevel gear and fixed to a lower portion of the vertical shaft.

4. The adjustable holding assembly of claim 3, wherein the upper bevel gear and the lower bevel gear are formed about entire peripheries thereof with a plurality of similar gear teeth.

5. The adjustable holding assembly of claim 4, wherein the gear teeth define various locking positions around the vertical pivot axis that passes through a center of the upper and lower bevel gears.

6. The adjustable holding assembly of claim 3, wherein an intermediate portion of the vertical shaft between the upper and lower bevel gears is formed with a smooth surface about which an enlarged cylindrical end of the horizontal shaft rotates.

7. The adjustable holding assembly of claim 6, wherein the horizontal shaft includes a stepped portion extending from the enlarged cylindrical end, and a free end opposite the enlarged cylindrical end which extends into the holder.

8. The adjustable holding assembly of claim 6, wherein a cover is connected to the enlarged cylindrical end of the horizontal shaft, and is configured to conceal and protect portions of the base assembly and the latching arrangement.

9. The adjustable holding assembly of claim 4, wherein the holder includes a tubular body having an open upper end and a closed lower end provided with a head assembly adapted to be engaged with the tubular member.

10. The adjustable holding assembly of claim 9, wherein the head assembly includes an inner tube mount fixed to the tubular body, a head rotatably attached to the inner tube mount, a cap defining the closed lower end of the tubular body, and an adjustment bolt extending through the cap and the inner tube mount.

11. The adjustable holding assembly of claim 10, wherein the adjustment bolt is configured for engagement with the head to prevent rotation thereof, and for holding the cap relative to the tubular body.

12. The adjustable holding assembly of claim 10, wherein the latching arrangement includes a hub attached to the tubular body, a hub gear attached to the hub, a latching lever positioned between the hub and the hub gear, a spring positioned in the inner tube mount and surrounding the horizontal shaft, and a retainer engaged with the spring and the horizontal shaft.

13. The adjustable holding assembly of claim 12, wherein the hub gear is provided along an entire periphery thereof with a plurality of gear teeth which are configured for engagement and disengagement with the gear teeth of the upper and lower bevel gears.

14. The adjustable holding assembly of claim 12, wherein the spring is configured to provide a biasing force for engaging the hub gear with the upper and lower bevel gears in the multiple angular locked positions.

15. The adjustable holding assembly of claim 12, wherein the latching lever is mounted for limited rocking motion on the horizontal shaft between the hub and the hub gear against the biasing force of the spring to disengage the hub gear from the upper and lower bevel gears to enable the holder to be moved to an unlocked position and to be pivoted about the vertical shaft and the horizontal shaft.

16. The adjustable holding assembly of claim 15, wherein the latching lever is mounted for movement about a latching pivot axis which is perpendicular to a plane defined by the vertical pivot axis and the horizontal pivot axis.

17. The adjustable holding assembly of claim 1, wherein the holder and the latching arrangement are movable into and out of engagement with the base assembly.

18. An adjustable holding assembly adapted to support a tubular member in multiple angular positions, the assembly comprising:
a base assembly adapted to be mounted to a support surface, the base assembly including a vertical shaft defining a vertical pivot axis and a horizontal shaft rotatable about the vertical shaft and defining a horizontal pivot axis;
a holder adapted to receive the tubular member, and pivotally mounted to the base assembly so that the holder is simultaneously rotatable about the vertical pivot axis and the horizontal pivot axis; and
a single latching arrangement carried by the horizontal shaft and configured for selective engagement and disengagement with the base assembly along the horizontal pivot axis to permit a one-handed adjustment of the holder simultaneously about the vertical pivot axis and the horizontal pivot axis or separately about either the vertical pivot axis or the horizontal pivot axis,
wherein the holder includes a tubular body and an adjustable head assembly mounted in the tubular body and adapted to fix a rotatable position of a tubular member supported in the holder.

19. The adjustable holding assembly of claim 18, wherein the adjustable head assembly includes an inner tube mount fixed to the tubular body, a head rotatably attached to the inner tube mount, a cap forming a lower end of the tubular body and an adjustable bolt extending through the cap and the inner tube mount, and configured for engagement with the head to prevent rotation thereof and for holding the cap relative to the tubular body.

20. An adjustable holding assembly adapted to support a tubular member in multiple angular positions, the assembly comprising:
a base assembly adapted to be mounted to a support surface, the base assembly including a vertical shaft defining a vertical pivot axis and a horizontal shaft rotatable about the vertical shaft and defining a horizontal pivot axis, the base assembly further including spaced apart upper and lower bevel gears fixed to the vertical shaft;
a holder adapted to receive the tubular member, and pivotally mounted to the base assembly so that the holder is simultaneously rotatable about the vertical pivot axis and the horizontal pivot axis; and
a spring biased latching arrangement carried by the horizontal shaft and including a hub gear configured for selective engagement and disengagement with the upper and lower beveled gears of the base assembly along the horizontal pivot axis thereof to permit a one-handed adjustment of the holder simultaneously about the vertical pivot axis and the horizontal pivot axis or separately about either the vertical pivot axis or the horizontal pivot axis to multiple angular locked positions with respect to the base assembly.

* * * * *